United States Patent
Baker et al.

(10) Patent No.: US 11,074,506 B2
(45) Date of Patent: Jul. 27, 2021

(54) ESTIMATING THE AMOUNT OF DEGRADATION WITH A REGRESSION OBJECTIVE IN DEEP LEARNING

(71) Applicant: D5AI LLC, Maitland, FL (US)

(72) Inventors: James K. Baker, Maitland, FL (US); Bradley J. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/646,169

(22) PCT Filed: Sep. 17, 2018

(86) PCT No.: PCT/US2018/051332
§ 371 (c)(1),
(2) Date: Mar. 11, 2020

(87) PCT Pub. No.: WO2019/067248
PCT Pub. Date: Apr. 4, 2019

(65) Prior Publication Data
US 2020/0279188 A1    Sep. 3, 2020

Related U.S. Application Data

(60) Provisional application No. 62/564,754, filed on Sep. 28, 2017.

(51) Int. Cl.
*G06F 15/18* (2006.01)
*G06N 3/08* (2006.01)
(Continued)

(52) U.S. Cl.
CPC ........... *G06N 3/088* (2013.01); *G06K 9/6267* (2013.01); *G06N 3/04* (2013.01); *G06N 3/0445* (2013.01);
(Continued)

(58) Field of Classification Search
CPC .......... G06T 2207/20081; G06T 2207/20084; G06N 3/08–088; G06N 7/00–026; G06N 20/00–20
(Continued)

(56) References Cited

U.S. PATENT DOCUMENTS

2005/0107947 A1* 5/2005 Han ................... G06K 9/4652
382/171
2008/0162386 A1* 7/2008 Rifkin ................ G06N 7/005
706/12

(Continued)

OTHER PUBLICATIONS

Vincent et al. "Stacked Denoising Autoencoders: Learning Useful Representations in a Deep Network with a Local Denoising Criterion", 2010, Journal of Machine Learning Research.*
International Search Report and Written Opinion of the International Searching Authority for International Application No. PCT/US18/51332 dated Jan. 16, 2019.

*Primary Examiner* — Jue Louie
(74) *Attorney, Agent, or Firm* — K&L Gates LLP

(57) ABSTRACT

Computer systems and computer-implemented methods train a machine-learning regression system. The method comprises the step of generating, with a machine-learning generator, output patterns; distorting the output patterns of the generator by a scale factor to generate distorted output patterns; and training the machine-learning regression system to predict the scaling factor, where the regression system receives the distorted output patterns as input and learns and the scaling factor is a target value for the regression system. The method may further comprise, after training the machine-learning regression system, training a second machine-learning generator by back propagating partial derivatives of an error cost function from the regression system to the second machine-learning generator and training the second machine-learning generator using stochastic gradient descent.

43 Claims, 7 Drawing Sheets

(51) Int. Cl.
*G06N 3/04* (2006.01)
*G06N 20/00* (2019.01)
*G06N 7/00* (2006.01)
*G06K 9/62* (2006.01)
*G06N 3/063* (2006.01)
*G06F 17/18* (2006.01)
*G06F 12/0815* (2016.01)

(52) U.S. Cl.
CPC ......... *G06N 3/0454* (2013.01); *G06N 3/0472* (2013.01); *G06N 3/063* (2013.01); *G06N 3/084* (2013.01); *G06N 7/005* (2013.01); *G06N 20/00* (2019.01); *G06F 12/0815* (2013.01); *G06F 17/18* (2013.01); *G06N 3/0481* (2013.01)

(58) Field of Classification Search
USPC ........... 706/12–16, 19, 23, 25; 382/155–157, 382/160
See application file for complete search history.

(56) References Cited

U.S. PATENT DOCUMENTS

| | | | |
|---|---|---|---|
| 2013/0034313 A1* | 2/2013 | Lin | G06T 3/4053 |
| | | | 382/299 |
| 2014/0358504 A1* | 12/2014 | Baumstein | G01V 99/005 |
| | | | 703/2 |
| 2016/0277767 A1* | 9/2016 | Le Pendu | H04N 19/124 |
| 2016/0321523 A1 | 11/2016 | Sen et al. | |
| 2017/0091574 A1 | 3/2017 | Udupa et al. | |
| 2017/0213321 A1 | 7/2017 | Matviychuk et al. | |
| 2017/0215756 A1 | 8/2017 | Galloway et al. | |
| 2017/0287109 A1* | 10/2017 | Tasfi | G06T 3/4046 |
| 2017/0358065 A1* | 12/2017 | Lukac | G06T 5/20 |
| 2017/0372193 A1* | 12/2017 | Mailhe | G06N 3/0472 |
| 2018/0089806 A1* | 3/2018 | Bitterli | G06T 5/20 |
| 2018/0293707 A1* | 10/2018 | El-Khamy | G06T 3/4069 |
| 2018/0342045 A1* | 11/2018 | Lutz | G06N 3/08 |

* cited by examiner

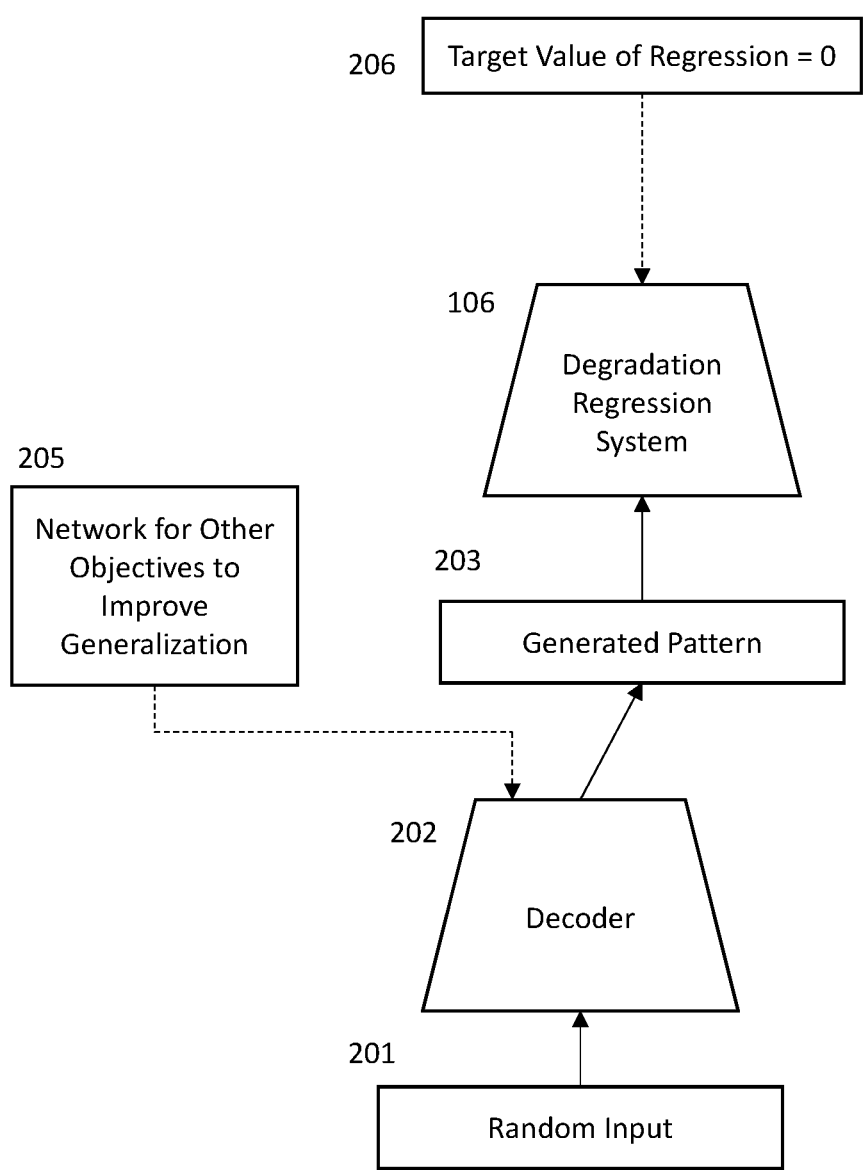

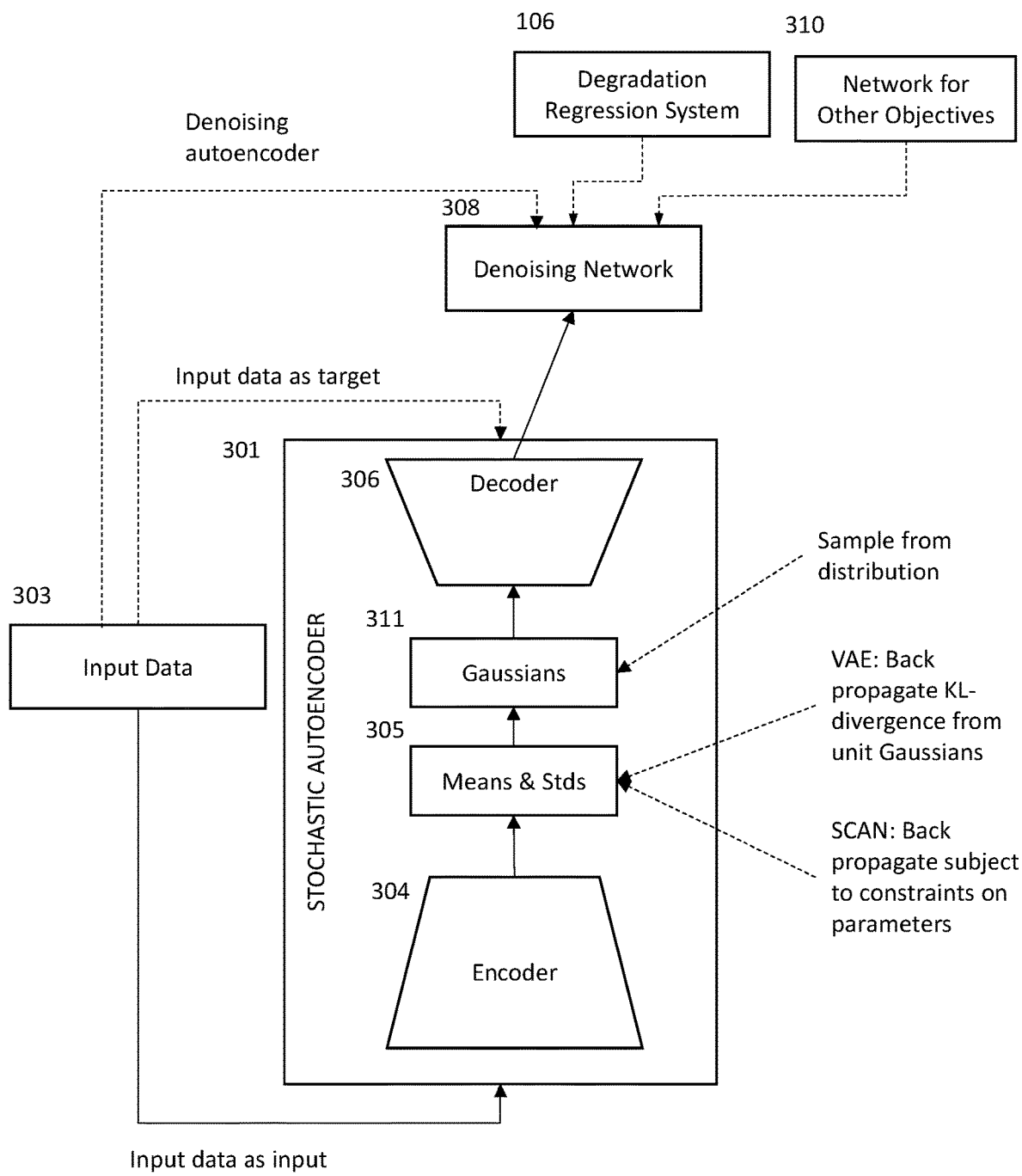

ESTIMATING THE AMOUNT OF DEGRADATION WITH A REGRESSION OBJECTIVE IN DEEP LEARNING

PRIORITY CLAIM

The present application is a national stage application under 35 U.S.C. § 371 of PCT application Serial No. PCT/US18/51332, which claims priority to U.S. provisional patent application Ser. No. 62/564,754, entitled "Aggressive Development with Cooperative Generators," filed Sep. 28, 2017, which is incorporated herein by reference in its entirety.

BACKGROUND

Machine learning systems using deep neural networks can be used to generate unlimited quantities of data that can, among other uses, train other machine learning systems. However, many generators produce data below optimal quality with flaws such as blurriness, random noise or artifacts, and other forms of degradation. It is beneficial to be able to remove such degradation and produce more ideal data. Two methods, Variational Autoencoders (VAEs) and Generative Adversarial Networks (GANs), have emerged as leading techniques for generative modeling within artificial intelligence and deep learning. Each has disadvantages.

VAEs use a stochastic process in generation and maximize the likelihood that generated data come from the same statistical distribution as real data. The maximum likelihood computation involves averaging over all possible real data. As a result, they tend to produce images that may be somewhat blurred.

GANs are designed to produce sharp, highly-realistic images through an iterative competition between a generator and a discriminator that attempts to distinguish between real data and generated data. GANs frequently suffer from mode collapse, where the GAN generates representatives of only a small proper subset of the modes of a multi-modal distribution, in some cases generating representatives of only a single mode. This reduces diversity among generated data and limits the usefulness of GANs in some applications.

SUMMARY

In one general aspect, the present invention comprises a machine learning system designed to identify the amount of degradation or noise incorporated into a data item through regressing on the degree of degradation, and a method for using that information to train a machine learning system to reduce the degree of degradation in a generated data item. A system that can estimate the amount of degradation in a data item is useful as a component in many other types of systems. By way of illustrative example, two uses of such as system are (i) in training a generator to produce more realistic images with a target of zero degradation, and (ii) to improve the ability of a VAE to reconstruct the original input data more accurately, despite the limitations inherent to a stochastic bottleneck layer. These and other benefits of the present invention will be apparent from the description that follows.

FIGURES

Various embodiments of the present invention are described herein by way of example in connection with the following figures, wherein:

FIG. 2 illustrates a block diagram of an illustrative example of the use of the degradation regression machine learning system depicted in FIG. 1, according to various aspects of the invention.

Figure 1:
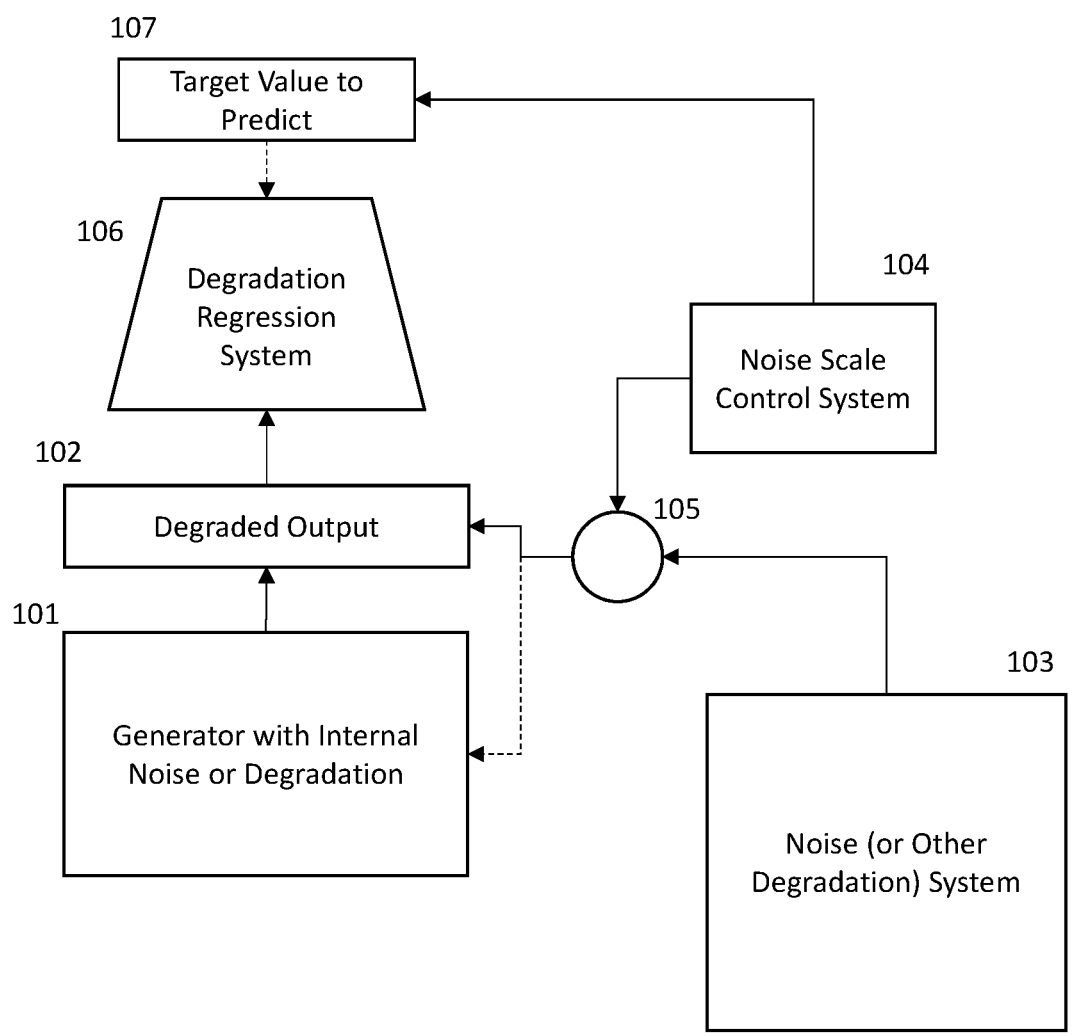
FIG. 1 illustrates a block diagram of a system comprising a degradation regression machine learning system according to an illustrative embodiment of the invention.
Figure 3A:
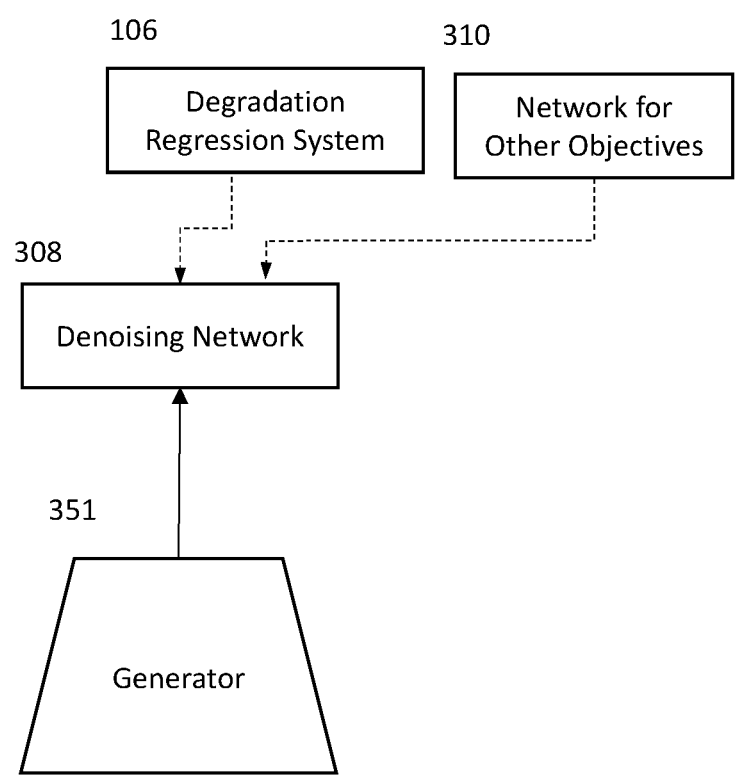
Figure 3B:
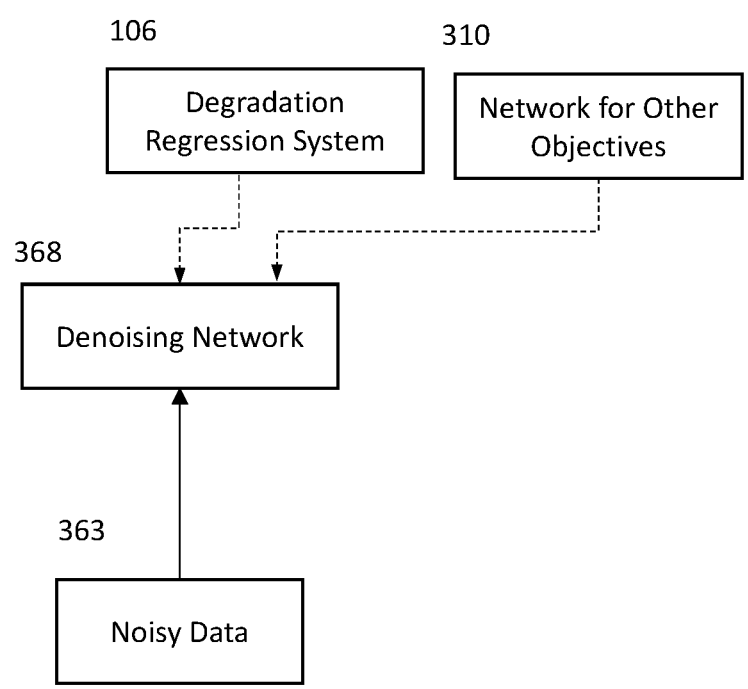

FIGS. 3, 3A, and 3B are block diagrams of illustrative examples of a use of the degradation regression machine learning system depicted in FIG. 1, according to various embodiments of the invention.

Figure 4:
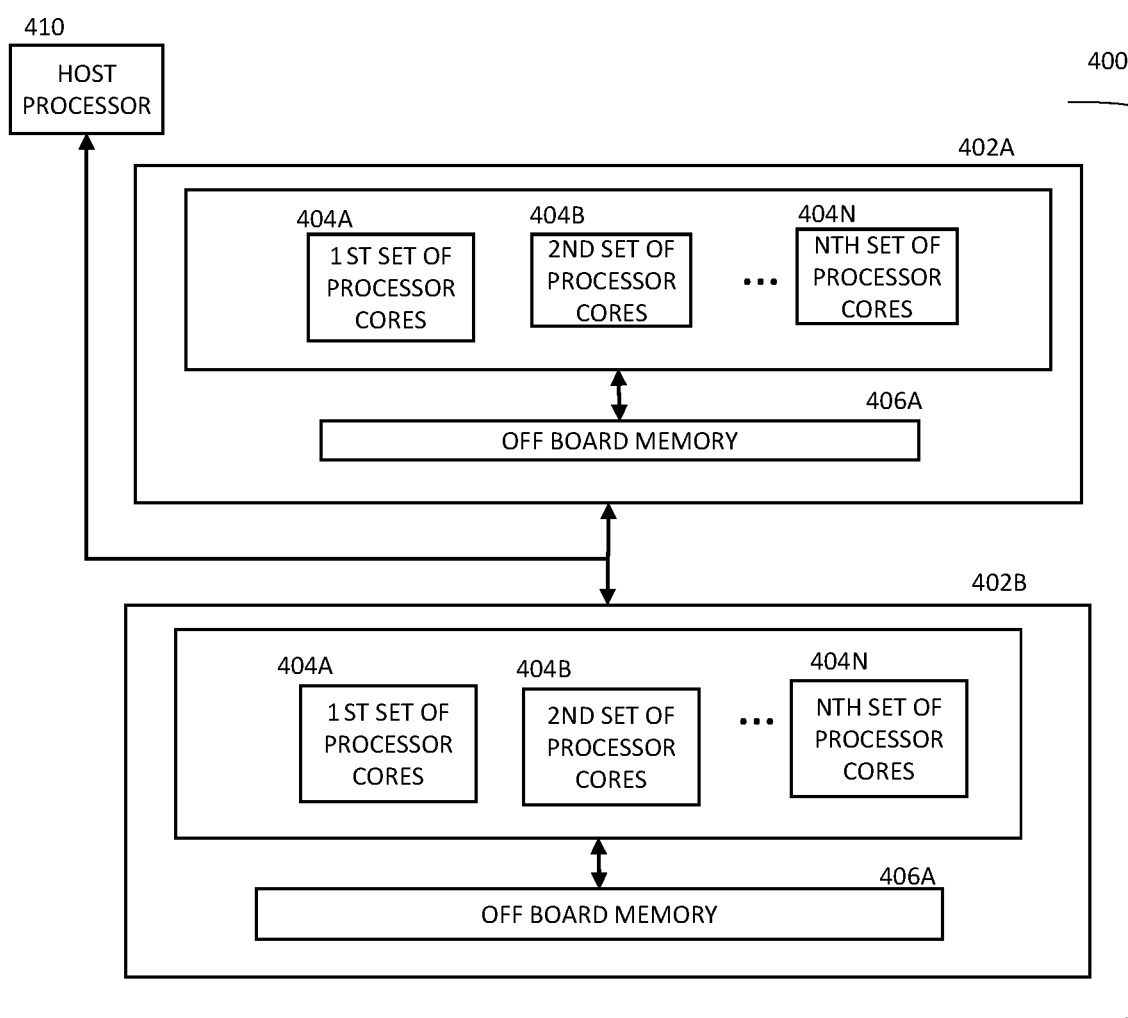

FIG. 4 is a diagram of a computer system that may be used to implement various embodiments.

Figure 5:
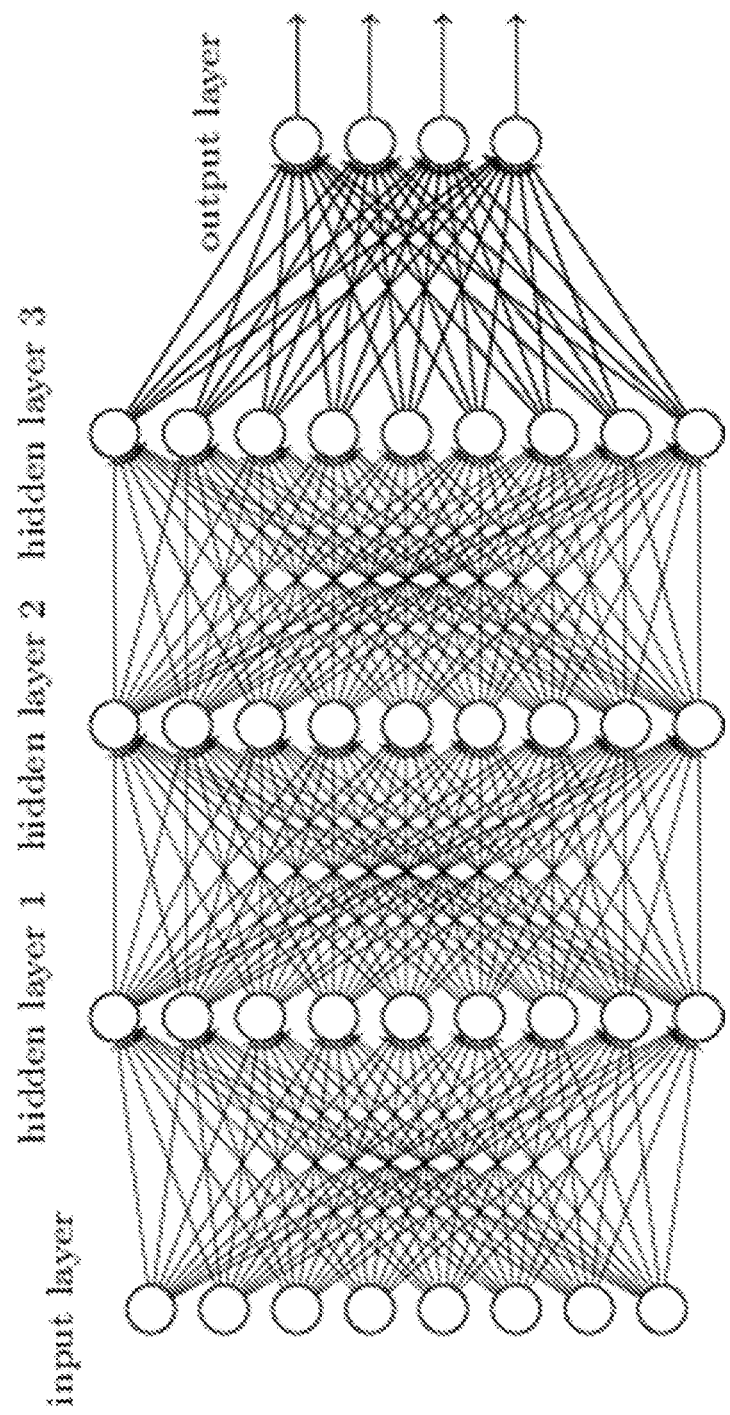

FIG. 5 is a diagram illustrating a deep neural network of the type that might be used in various aspects of various embodiments of the invention.

DETAILED DESCRIPTION

FIGS. 1, 2, 3, 3A, and 3B are block diagrams of machine-learning data-generator systems according to various embodiments of the present invention. The machine-learning data-generator systems may be implemented on a computer system, such as the computer system 400, illustrated in FIG. 4.

FIG. 1 illustrates an aspect of the invention that is useful in various embodiments. The system illustrated in FIG. 1 includes a data generator 101, which may be any suitable type of generator, such as an autoencoder, a VAE, a GAN, or a stochastic categorical autoencoder network (SCAN). A noise system 103 produces noise or other degradation, either to apply internally to the generator 101 (e.g., an internal layer of the neural network of the generator 101, as indicated by the dashed line from the scaling unit 105 to the generator 101) or to apply to the generator output 102 (as indicated by the solid line from the scaling unit 105 to the generator output 102). The noise system 103 preferably always produces noise or other degradation at or near a constant level in a specified metric, such as the L2 norm.

A noise scale control system 104 sets a scale factor that scales the amount of noise or other degradation from the noise system 103. The amount of noise/degradation from the noise scale control system 104 can vary for each output of the generator 101. The scaling operation is done in a scaling unit 105. For example, the scaling unit 105 could multiply the amplitude of the noise from the noise system 103 by a number (e.g., the scaling factor from the noise scale control system 104) between 0 and 1. Alternately, the scaling unit 105 could apply any monotonic scaling with a range from zero to some positive number, where a scaling of zero corresponds to no noise or other degradation, and where the amount of noise/degradation increases with increasing scaling factors. Again, the amount of noise/distortion can vary for each degraded output pattern 102 from the generator 101. In some embodiments, the generator 101 may be a stochastic generator with control of the degree of dispersion of the probability distribution of the samples that it generates. In such embodiments, the noise scale control system 104 may also directly control the degree of dispersion of the generator 101.

The system also includes a regression-type machine learning system 106. Machine-learning regression systems learn, through training, to predict a value given some input. In this case, the regression-type machine learning system 106 attempts to estimate the scale factor of the noise/degradation that has been applied output pattern. If the scale factor is varied for each degraded output pattern 102, the regression system 106 learns to estimate the scale factor for each degraded output pattern 102 that is input to the regression system 106. During training of the regression-type machine learning system 106, the noise scale control system 104 supplies to block 107 the numerical value of the scaling factor for the noise or other degradation as the target value for the regression system 106 to predict based on the input pattern 102. The regression-type machine learning system 106 106 is thus trained to estimate the scale factor, which controls the amount of noise/degradation in the input pattern 102. Any suitable machine-learning system can be used for the regression system 106, although in a preferred embodiment, the regression type machine learning system 106 comprises a multi-layer feed-forward neural network that is trained with stochastic gradient descent. A multi-level feed-forward neural network and the training of a feed-forward neural network through stochastic gradient descent is described in more detail in connection with FIG. 5.

Since one type of degradation may create effects that match a different scale from a second type of degradation, in some embodiments multiple regression-type machine learning systems are trained, one for each type of noise or degradation being modeled.

Although the term "degradation" is used, in some embodiments noise system 103 does not produce noise but instead applies some parametrized transformation to the output 102 of the generator 101. For example, if the input data to the noise system 103 is an image, the noise system 103 may translate the image or rotate the image. In such embodiments, the noise scale control system 104 controls the amount of translation, rotation, or other transformation.

Notice that, like an autoencoder system, the regression system 106 can be trained on generated data, not just on a limited amount of real world training data. Thus, there is no limit to the amount of training data that can be made available for training the regression system 106. No matter how many learned parameters are in the regression-type machine learning system 106, enough training data can be supplied so that regression-type machine learning system 106 cannot merely memorize the training data.

In addition, there is no limit to the amount of data that can be generated as development data to test the performance of the regression system 106 on new data disjoint from the training data. Development testing, among other things, allows regularization and other hyperparameters of the regression system 106 to be optimized to reduce or eliminate overfitting, especially when combined with the capability to generate additional training data whenever development testing indicates the need. Development testing also can measure, and therefore optimize, the ability of the regression system 106 to generalize to new situations or to data in new regions of data space.

The property to generate new training and development data as needed is important in many applications. For example, the regression system 106 can be used in place of a real-vs-generated discriminator in a generative adversarial network (GAN) or in any multi-objective machine learning system that comprises a real-vs-generated discriminator. A real-vs-generated discriminator of sufficient complexity may learn to memorize all or some of the real training data. In that case, both the discriminator and the generator trained as its adversary would have poor generalization capabilities. Limiting the complexity of the discriminator or not training it to convergence may lessen this memorization effect but would compromise its ability to discriminate between the real and generated examples. Using the degradation regression system of FIG. 1 instead of an adversarial discriminator avoids this compromise.

FIG. 2 is an illustrative example of the post-trained use of the degradation regression system 106 from FIG. 1. In the illustrative embodiment shown in FIG. 2, the already-trained regression system 106 (e.g., trained according to the process shown in FIG. 1) is paired with a decoder 202 that generates output patterns 203 from random input data 201. The regression system 106 back propagates an error function, so the decoder 202 must be a type of machine-learning system that supports back propagation, such as a feed forward neural network. A multi-level feed-forward neural network and the training of a feed-forward neural network through stochastic gradient descent is described in more detail in connection with FIG. 5.

Because the decoder 202 generates output patterns 203 from random inputs 201, the decoder 202 is analogous to the generator for a generative adversarial network, except that in FIG. 2, the real-vs-generated discriminator of a GAN has been replaced by the regression system 106, which may have been trained as in FIG. 1. Because the regression system 106 is not trained to be adversarial to the generator (e.g., the decoder 202), it is not proper to call the embodiment illustrated in FIG. 2 an adversarial system even though it is superficially similar to a GAN.

The output 203 of the decoder 202 is fed as input to the regression system 106, which feeds the activation forward to the regression system output, which is an estimate of the degree of degradation in the generated patterns 203. The regression system 106 then back propagates an error cost function based on the target 206 with a target regression value of zero. The value of zero, meaning an estimated degradation of zero, is the objective of the generator/decoder 202. Although the regression system 106 back propagates the error cost function, the regression system 106 is not being trained in the embodiment illustrated in FIG. 2. It has already been trained by a process such as shown in FIG. 1. Instead, the regression system 106 back propagates the partial derivatives of the error cost function to its input block, the generated patterns 203, which is the output from the decoder 202.

The error cost function derivatives from the regression system 106 are then back propagated through generator/decoder network 202, which is then trained by stochastic gradient descent. Back propagation and stochastic gradient descent are well-known to those skilled in the art of training neural networks and are described in association with FIG. 5. Although the components are similar, the training behavior of the system shown in FIG. 2 is completely different from the training behavior of a generative adversarial network. Because regressions system 106 is not adversarial to the generator/decoder 202, the regression system 106 is not trained toward simply memorizing its training examples, the optimum solution to the two-person, zero-sum adversarial game inherent to training generative adversarial networks. Instead, the regression system 106 is trained to generalize from its training data and tested on independent development data. Furthermore, the regression system 106 has an unlimited amount of training data and development data, as described above in connection with FIG. 1.

The generator/decoder 202 is trained by the backpropagation from the regression system 106 the same way that the generator in a generative adversarial network is trained from the negative of the back propagation from a real-vs-generated classifier. However, because the regression system 106 is trained to generalize from its training data, the generator/decoder 202 of FIG. 2 learns to do that too.

Some embodiments optionally include a network 205, which back propagates an additional objective for training the generator/decoder 202 that further increases the tendency for the generator/decoder 202 to learn to generalize from its training data. The additional objective may be back propagated through the additional neural network 205. For example, the network 205 may comprise a real-vs-generated discriminator such as used in a generative adversarial network, which is well-known to those skilled in the art of deep learning. As another example, the network 205 may comprise a classifier. In general, one or more additional objectives from the network 205 reduces the ability of the generator/decoder 202 to train to over fit its training data and thus helps the generator/decoder 202 to learn to generalize.

Besides being used to replace the real-vs-generated classifier in any system that uses such a classifier, the degradation regression system 106 can be added as an additional objective to any system that does not use a real-vs-generated classifier.

FIG. 3 shows an illustrative embodiment in which the degradation regression system 106 is added to a stochastic autoencoder 301, such as a variational autoencoder (VAE) or a stochastic categorical autoencoder (SCAN), which will be discussed below. The stochastic autoencoder 301 is used as a generator in the embodiment shown in FIG. 3. In this embodiment, a machine-learning denoising network 308 may also be added. Training of a VAE performs averaging over randomly generated samples. The averaging in this training generally results in output patterns being somewhat blurred. This blurring is one of the disadvantages of a VAE compared, for example, to a GAN. Preferably, the degradation regression system 106 is trained on data examples in which some or all of the examples of degradation are examples of the output of a VAE compared to its input. In this case, the denoising network 308 learns to remove the blurriness in the output of the stochastic autoencoder 301, particularly when the stochastic autoencoder 301 is implemented with a VAE, in addition to any other degradation or transformation.

As shown in FIG. 3, the stochastic autoencoder comprises an encoder 304 and a decoder 306. During training, the encoder 304 receives input patterns 303 and outputs parameters of a parametric probability distribution, such as means and standard deviations 305, from which a sample of random variables 311 (e.g., a Gaussian distribution) is generated. The decoder 306 learns to output the input patterns 303 from the sample of random variables 311.

During generation, the encoder 304 and the training data 303 are not used; only the decoder 306 is used to generate output from the set of random variables 311, which are based on the parameters of the parametric probability distribution 305. These components and the training process are well-known to those skilled in the art of training stochastic autoencoders, such as VAEs. In the embodiment shown in FIG. 3, the training of the stochastic autoencoder 301 is modified to include back propagation from the degradation regression system 106 as well as back propagation through the denoising network 308, in addition to the normal error cost function from the input 303 directly back to the output of the stochastic autoencoder 301.

When used in the training of the stochastic autoencoder, the degradation regression system 106 has preferably already been trained. The degradation regression system 106 preferably back propagates from the objective of zero degradation, as described previously.

In some embodiments, the denoising system 308 has also already been trained and when used in training the stochastic autoencoder 301. In some embodiments, however, the stochastic autoencoder 301 can be been trained first and used in training the denoising system 308. In some embodiments, both the denoising system and the stochastic autoencoder 301 are trained together. For example, the denoising system 308 could be incorporated into the decoder 306. In such embodiments, when training the stochastic autoencoder 301, the input data 303 is supplied to the layer in the decoder 306 below the denoising subnetwork 308.

In some embodiments, the input data 303 is supplied as a target after the denoising system 308, instead of or in addition to being supplied before the denoising system 308. For example, in a denoising autoencoder, noise may be added between the input 303 and the encoder 304, and the input 303 may be supplied as a target after denoising system 308. As another example, where for example the stochastic autoencoder 301 in a variational autoencoder (VAE), the input 303 may be supplied as a target after the denoising system 308 and the denoising system 308 may be trained to remove the blurriness often present in images generated by a VAE.

In embodiments in which noise system 103 of FIG. 1 produces transformations of the output, such as translations or rotations, rather than a degradation, then in FIG. 3, the denoising system 308 is trained to perform the inverse transformation rather than as a denoising system.

The degradation regression system 106 in FIG. 3 is used for training the stochastic autoencoder 301 and is, therefore, preferably not trained during the training process illustrated in FIG. 3. Optionally, the denoising network 308 may have additional training during the training of the stochastic autoencoder 301 illustrated in FIG. 3.

Optionally, block 310 back propagates additional objectives to the stochastic autoencoder 301. For example, the block 310 may comprise an adversarial real-vs-generated discriminator, the output of which being back-propagated to the stochastic autoencoder 301. Back propagation from a real-vs-generated discriminator increases the tendency of the stochastic autoencoder 301 to generate realistic data. Further, the capability of the regression system 106 to train the stochastic autoencoder 301 to generalize better solves some of the problems of a pure GAN. As another example, block 310 may back propagate from the objective of a classifier. In this example, the stochastic autoencoder 301 is trained to generate data that can more easily be classified correctly.

In various embodiments, the stochastic autoencoder may comprise a stochastic categorical autoencoder network (SCAN), which is similar to a VAE, except that the parameters output 305 by the encoder 304 in a SCAN are parameters to control the parametric probability distribution of the stochastic layer 311 are not regularized to minimize the Kullbach-Leibler divergence as in a VAE. Instead, in a SCAN, hyperparameters directly control the relative magnitude of the means relative to the standard deviations 305. SCANs are described in more detail in U.S. patent application Ser. No. 16/124,977, filed Sep. 7, 2018, entitled "Stochastic Categorical Autoencoder Network." The training of a SCAN or other stochastic autoencoder is similar to the training described above for a VAE.

FIG. 3A shows an illustrative embodiment in which training similar to that described in FIG. 3 for a VAE or SCAN may be applied to any generator 351 that can be trained by back propagation. The embodiment of FIG. 3A employs the denoising system 308, the regression system 106, and other objectives 310 in FIG. 3. The denoising system 308 and the generator 351 are trained the same way as the denoising system 308 and the stochastic autoencoder 301 are trained in FIG. 3. In some embodiments, the denoising system 308 is optional, or equivalently, the generator 351 is trained like the generator 201, 202 of FIG. 2, except that the generator 351 may have a different design than the generator 201, 202 of FIG. 2.

FIG. 3B shows an illustrative embodiment in which a denoising system 368 is trained to reduce noise from any source of noisy data. In this embodiment, the regression system 106 and other objectives 310 are the same as the regression system 106 and other objectives 310 in FIG. 3. In this embodiment, however, the training of the denoising system 368 may be limited to the amount of noisy data 363 that is available as training data, which limits the ability of the denoising system 368 to learn to generalize, compared to other embodiments.

FIG. 4 is a diagram of a computer system computer system 400 that could be used to implement the embodiments described above. The illustrated computer system 400 comprises multiple processor units 402A-B that each comprises, in the illustrated embodiment, multiple (N) sets of processor cores 404A-N. Each processor unit 402A-B may comprise on-board memory (ROM or RAM) (not shown) and off-board memory 406A-B. The on-board memory may comprise primary, volatile and/or non-volatile storage (e.g., storage directly accessible by the processor cores 404A-N). The off-board memory 406A-B may comprise secondary, non-volatile storage (e.g., storage that is not directly accessible by the processor cores 404A-N), such as ROM, HDDs, SSD, flash, etc. The processor cores 404A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 410 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 404 may train and/or implement different networks or subnetworks or components. For example, in one embodiment, the cores of the first processor unit 402A may implement the generator 101 in FIG. 1 and the second processor unit 402B may implement the regression machine learning system 106. As another example, with reference to FIG. 3, the cores of the first processor unit 402A may implement the stochastic autoencoder 301, the cores of the second processing unit 402B may implement the regression machine learning system 106, the cores of yet another processing unit (now shown) may implement the denoising system 308, and the cores of yet another processing unit (now shown) may implement real vs. generated discriminator for the other objectives 310. As yet another embodiment, the cores 404A-N of the first processing unit 402A may implement the stochastic autoencoder 301; the first set of cores 404A of the second processing unit 402B may implement the regression machine learning system 106; the second set of cores 404B of the second processing unit 402B may implement the denoising system 308; and another set of cores 404N of second processing unit 402B may implement real vs. generated discriminator for the other objectives 310. One or more host processors 410 may coordinate and control the processor units 402A-B.

In other embodiments, the system 400 could be implemented with one processor unit 402. In embodiments where there are multiple processor units, the processor units could be co-located or distributed. For example, the processor units 402 may be interconnected by data networks, such as a LAN, WAN, the Internet, etc., using suitable wired and/or wireless data communication links. Data may be shared between the various processing units 402 using suitable data links, such as data buses (preferably high-speed data buses) or network links (e.g., Ethernet).

The software for the various computer system 400s described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

FIG. 5 is a drawing of an example of a multi-layer feed-forward deep neural network. Many components of the current invention are neural networks, such as the example neural network shown in FIG. 4. A neural network is a collection of nodes and directed arcs. The nodes in a neural network are often organized into layers. In a feed-forward neural network, the layers may be numbered from bottom to top, when diagramed as in FIG. 5. Each directed arc in a layered feed-forward neural network goes from a source node in a lower layer to a destination node in a higher layer. The feed-forward neural network shown in FIG. 5 has an input layer, an output layer, and three inner layers. An inner layer in a neural network is also called a "hidden" layer. Each directed arc is associated with a numerical value called its "weight." Typically, each node other than an input node is associated with a numerical value called its "bias." The weights and biases of a neural network are called "learned" parameters. During training, the values of the learned parameters are adjusted by the computer system 400 shown in FIG. 4. Other parameters that control the training process are called hyperparameters.

A feed-forward neural network may be trained by the computer system 400 using an iterative process of stochastic gradient descent with one iterative update of the learned parameters for each minibatch. The full batch of training data is typically arranged into a set of smaller, disjoint sets called minibatches. An epoch comprises the computer system 400 doing a stochastic gradient descent update for each minibatch contained in the full batch of training data. For each minibatch, the computer estimates the gradient of the objective for a training data item by first computing the activation of each node in the network using a feed-forward activation computation. The computer system 400 then estimates the partial derivatives of the objective with respect to the learned parameters using a process called "back-propagation," which computes the partial derivatives based on the chain rule of calculus, proceeding backwards through the layers of the network. The processes of stochastic gradient descent, feed-forward computation, and back-propagation are well-known to those skilled in the art of training neural networks.

In one general aspect, the present invention is directed to computer systems and computer-implemented method for training a machine-learning regression system. According to various embodiments the method comprises the step of, with reference to FIG. 1 by way of example, generating, with a machine-learning generator 101, output patterns, where the machine-learning generator 101 is implemented by a computer system 400 comprising a set of processor cores 404A-N. The method further comprises the step of distorting, by the computer system, the output patterns of the generator to generate distorted output patterns 102, where a scale of distortion of the output patterns is controlled by a scaling factor 104. The method further comprises the step of training, by the computer system, a machine-learning regression system 106 to predict the scaling factor, where the regression system receives the distorted output patterns as input and learns and the scaling factor is a target value 107 for the regression system.

In another general aspect, the computer system may comprise a set of processor cores 404A-N and computer memory that stores software that, when executed by the set of processor cores, causes the set of processor cores to: generate, with a machine-learning generator, output patterns; distort the output patterns of the generator to generate distorted output patterns, wherein a scale of distortion of the output patterns is controlled by a scaling factor; and train a machine-learning regression system to predict the scaling factor, where the regression system receives the distorted output patterns as input and learns and the scaling factor is a target value for the regression system.

According to various implementations, distorting the output patterns of the generator comprises applying the distortion to an output of the generator. Also, the generator may comprise a network with multiple layers, including an internal layer, in which case distorting the output patterns can comprise applying the distortion to the internal layer of the generator to thereby generate the distorted output patterns. In addition, the distortion may comprise noise applied to the output patterns and the scaling factor controls an amount of noise applied to the output patterns. Alternatively, the distortion may comprise a degradation of the output patterns, in which case the scaling factor controls an amount of degradation to the output patterns. Still further, the distortion may comprise a transformation of the output patterns, in which case the scaling factor controls an amount of transformation of the output patterns.

In various implementations, the generator may comprise an autoencoder, such as a variational autoencoder (VAE) or a stochastic categorical autoencoder network (SCAN). Also, the generator may comprise a generative adversarial network (GAN). Also, the generator may comprise a stochastic generator that produces parameters for probability distributions of the output patterns, in which case the method may further comprise controlling a degree of dispersion for the probability distributions.

In another general aspect, the computer-implemented methods of the present invention may further comprise, after training the machine-learning regression system, training, with the computer system, a second machine-learning generator, where an output of the second machine-learning generator is fed into the machine-learning regression system. Training the second machine-learning generator comprises back propagating partial derivatives of an error cost function from the regression system to the second machine-learning generator; and training the second machine-learning generator using stochastic gradient descent.

According to various implementations, a target regression value for the machine-learning regression system in training the second machine-learning generator is zero. Also, training the second machine-learning generator may comprise back-propagating a second objective from a second network to the second machine-learning generator. The second network may comprise a classifier or a real-vs-generated discriminator, for example. Also, the second machine-learning generator may comprise a machine-learning decoder 201 (see FIG. 2) that generates output patterns from random input; or a stochastic autoencoder, such as a VAE or SCAN.

According to still further implementations, the computer system implementing a machine-learning denoising network 308 for denoising output from the second machine-learning generator. The machine-learning denoising network may be trained prior to training the second machine-learning generator.

Based on the above description, it is clear that the machine-learning systems of the present invention, with a regression system trained according to the procedures above, is capable of generating unlimited quantities of data that can, among other uses, train other machine learning systems. Moreover, the embodiments of the present invention do no suffer from the problems and drawbacks associated with conventional VAEs and GANs.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method comprising:
   generating, with a machine-learning generator, output patterns, wherein the machine-learning generator is implemented by a computer system comprising a set of processor cores;
   distorting, by the computer system, the output patterns of the machine-learning generator to generate distorted output patterns, wherein a scale of distortion of the output patterns is controlled by a scaling factor;
   training, by the computer system, a machine-learning regression system to predict the scaling factor, wherein the machine-learning regression system receives the distorted output patterns as input and learns to predict the scaling factor from the distorted output patterns by using the scaling factor for each distorted output pattern as a target value for the machine-learning regression system;
   after training the machine-learning regression system, training, with the computer system, a second machine-learning generator, wherein:

an output of the second machine-learning generator is fed into the machine-learning regression system; and training the second machine-learning generator comprises:

back propagating partial derivatives of an error cost function from the machine-learning regression system to the second machine-learning generator; and training the second machine-learning generator using stochastic gradient descent.

2. The method of claim 1, wherein distorting the output patterns of the machine-learning generator comprises applying the distortion to an output of the machine-learning generator.

3. The method of claim 1, wherein:
the machine-learning generator comprises a network with multiple layers, including an internal layer; and
distorting the output patterns comprises applying the distortion to the internal layer of the machine-learning generator to thereby generate the distorted output patterns.

4. The method of claim 1, wherein:
the distortion comprises noise applied to the output patterns; and
the scaling factor controls an amount of noise applied to the output patterns.

5. The method of claim 1, wherein:
the distortion comprises a degradation of the output patterns; and
the scaling factor controls an amount of degradation to the output patterns.

6. The method of claim 1, wherein:
the distortion comprises a transformation of the output patterns; and
the scaling factor controls an amount of transformation of the output patterns.

7. The method of claim 1, wherein the machine-learning generator comprising an autoencoder.

8. The method of claim 7, wherein the autoencoder comprises an autoencoder selected from the group consisting of a variational autoencoder and a stochastic categorical autoencoder network.

9. The method of claim 1, wherein the machine-learning generator comprises a generative adversarial network.

10. The method of claim 1, wherein the machine-learning generator comprises a stochastic machine-learning generator that produces parameters for probability distributions of the output patterns.

11. The method of claim 10, further comprising controlling a degree of dispersion for the probability distributions.

12. The method of claim 1, wherein a target regression value for the machine-learning regression system in training the second machine-learning generator is zero.

13. The method of claim 12, wherein the second machine-learning generator comprises a machine-learning decoder that generates output patterns from random input.

14. The method of claim 12, wherein the second machine-learning generator comprises a stochastic autoencoder.

15. The method of claim 14, wherein the stochastic autoencoder comprises a variational autoencoder.

16. The method of claim 14, wherein the stochastic autoencoder comprises a stochastic categorical autoencoder.

17. The method of claim 14, further comprising, by the computer system, implementing a machine-learning denoising network for denoising output from the second machine-learning generator.

18. The method of claim 17, further comprising, by the computer system, training the machine-learning denoising network prior to training the second machine-learning generator.

19. The method of claim 17, wherein training the second machine-learning generator comprises back-propagating a second objective from a second network to the second machine-learning generator.

20. The method of claim 19, wherein the second network comprises a classifier.

21. The method of claim 19, wherein the second network comprises a real-vs-generated discriminator.

22. The method of claim 12, further comprising, by the computer system, implementing a machine-learning denoising network for denoising output from the second machine-learning generator.

23. The method of claim 22, wherein training the second machine-learning generator comprises back-propagating a second objective from a second network to the second machine-learning generator.

24. The method of claim 1, wherein training the second machine-learning generator comprises back-propagating a second objective from a second network to the second machine-learning generator.

25. The method of claim 24, wherein the second network comprises a classifier.

26. The method of claim 24, wherein the second network comprises a real-vs-generated discriminator.

27. A computer-implemented method of training a first machine-learning generator, the method comprising:
back propagating, by a computer system comprising a set of processor cores, partial derivatives of an error cost function from a machine-learning regression system to the first machine-learning generator, wherein:
an output of a second machine-learning generator is fed into the machine-learning regression system;
the machine-learning regression system is trained to predict a scaling factor of distortion applied to training examples provided to the machine-learning regression system;
the scaling factor is a target value for the machine-learning regression system during training of the machine-learning regression system; and
a target regression value for the machine-learning regression system in training the first machine-learning generator is zero; and
training, by the computer system, the first machine-learning generator using stochastic gradient descent.

28. The method of claim 27, wherein training the first machine-learning generator comprises back-propagating a second objective from a second network to the first machine-learning generator.

29. The method of claim 28, wherein the second network comprises a classifier.

30. The method of claim 28, wherein the second network comprises a real-vs-generated discriminator.

31. The method of claim 27, wherein the first machine-learning generator comprises a machine-learning decoder that generates output patterns from random input.

32. The method of claim 27, wherein the first machine-learning generator comprises a stochastic autoencoder.

33. The method of claim 32, wherein the stochastic autoencoder comprises a variational autoencoder.

34. The method of claim 32, wherein the stochastic autoencoder comprises a stochastic categorical autoencoder.

35. The method of claim 32, further comprising, by the computer system, implementing a machine-learning denoising network for denoising output from the first machine-learning generator.

36. The method of claim 35, further comprising, by the computer system, training the machine-learning denoising network prior to training the first machine-learning generator.

37. The method of claim 35, wherein training the first machine-learning generator comprises back-propagating a second objective from a second network to the first machine-learning generator.

38. The method of claim 37, wherein the second network comprises a classifier.

39. The method of claim 37, wherein the second network comprises a real-vs-generated discriminator.

40. The method of claim 27, further comprising, by the computer system, implementing a machine-learning denoising network for denoising output from the first machine-learning generator.

41. The method of claim 40, wherein training the first machine-learning generator comprises back-propagating a second objective from a second network to the first machine-learning generator.

42. A machine-learning computer system comprising:
a set of processor cores: and computer memory that stores software that, when executed by the set of processor cores, causes the set of processor cores to:
  generate, with a machine-learning generator, output patterns;
  distort the output patterns of the machine-learning generator to generate distorted output patterns, wherein a scale of distortion of the output patterns is controlled by a scaling factor;
  train a machine-learning regression system to predict the scaling factor, wherein the machine-learning regression system receives the distorted output patterns as input and learns to predict the scaling factor from the distorted output patterns by using the scaling factor for each distorted output pattern as a target value for the machine-learning regression system; and
  after training the machine-learning regression system, train a second machine-learning generator, wherein:
    an output of the second machine-learning generator is fed into the machine-learning regression system; and
    the software further causes the set of processor cores to train the second machine-learning generator by:
      back-propagating partial derivatives of an error cost function from the machine-learning regression system to the second machine-learning generator; and
      training the second machine-learning generator using stochastic gradient descent.

43. A machine-learning computer system comprising:
a set of processor cores: and
computer memory that stores software that, when executed by the set of processor cores, causes the set of processor cores to training a machine-learning generator by:
  back propagating partial derivatives of an error cost function from a machine-learning regression system to the machine-learning generator, wherein:
    an output of a second machine-learning generator is fed into the machine-learning regression system;
    the machine-learning regression system is trained to predict a scaling factor of distortion applied to training examples provided to the machine-learning regression system;
    the scaling factor is a target value for the machine-learning regression system during training of the machine-learning regression system; and
    a target regression value for the machine-learning regression system in training the machine-learning generator is zero; and
  training the machine-learning generator using stochastic gradient descent.

* * * * *